Dec. 24, 1957 C. E. BRICKER 2,817,421
BRAKES HAVING COMPRESSED AIR RETURN MEANS THEREIN
Filed Aug. 23, 1955
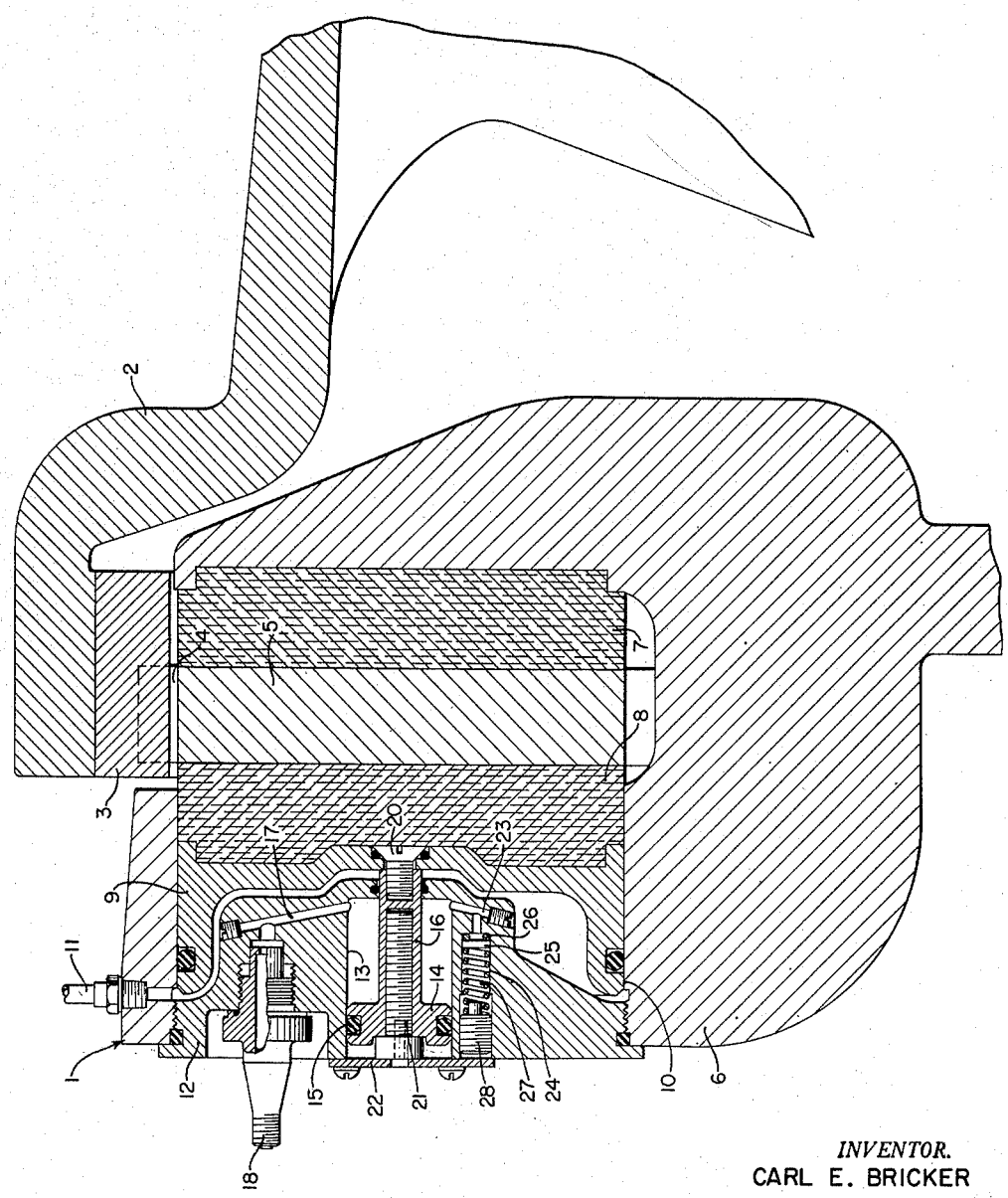
INVENTOR.
CARL E. BRICKER
BY
*R. L. Miller*
ATTORNEY

United States Patent Office 2,817,421
Patented Dec. 24, 1957

2,817,421

BRAKES HAVING COMPRESSED AIR RETURN MEANS THEREIN

Carl E. Bricker, Akron, Ohio, assignor to The Goodyear Tire & Rubber Company, Akron, Ohio, a corporation of Ohio Application August 23, 1955, Serial No. 530,166

2 Claims. (Cl. 188—152)

This invention relates to brakes, and especially to a brake having chambers therein using compressed gases for returning the brake piston means to inoperative or clearance position when the brake is released.

Heretofore many different types of brake constructions have been provided and nearly all brakes have some type of spring or other means provided therein for returning the brake piston and associated means to inoperative or clearance position. The present invention particularly relates to so called "spot" type of brakes wherein relatively small diameter brake lining discs are pressed against portions of the sides of a relatively large brake disc, for example, rotating with a wheel and to which the braking forces are to be applied. These spot type of brakes heretofore have had relatively complicated, expensive means provided therein for returning the brake components to inoperative, or clearance position.

The general object of the present invention is to provide a new and improved type of a brake construction characterized by the use of a compressed gas operated piston for returning the braking means to a clearance position when the brake is released.

Another object of the invention is to provide a relatively uncomplicated, inexpensive type of means in a brake for returning a brake to an inoperative, clearance position.

Another object of the invention is to provide a brake having an auxiliary piston therein for use in returning the brake means to released, clearance position and wherein the auxiliary piston is operated by compressed gas continuously received in a normally sealed chamber of the brake.

Another object of the invention is to provide a controllable supply of a gas under pressure to an operative return cylinder of a brake and to provide such chamber with means for preventing the buildup of excessive pressures therein.

Yet another object of the invention is to provide a brake with means for readily limiting or determining the inoperative or release position of an auxiliary control piston provided in the brake.

The foregoing and other objects and advantages of the invention will be made more apparent as the specification proceeds.

For a better understanding of the invention, reference is now directed to the accompanying drawing which illustrates one currently preferred embodiment of the invention, and wherein a fragmentary vertical section of a wheel and brake assembly with the novel brake control means of the invention associated therewith, is shown.

When referring to corresponding parts shown in the accompanying drawing and referred to in the specification, corresponding numerals are used to facilitate comparison between such corresponding parts.

The details of the structure shown in the accompanying drawing will now be described to clarify the construction and operation of the brake of the invention which is indicated as a whole by the numeral 1. The brake 1 is shown associated with a wheel 2. The wheel 2 has a plurality of axially extending keys 3 suitably secured thereto and engaging key slots 4 provided at spaced points on the periphery of a brake disc 5. Thus the brake disc 5 is engaged with the wheel 2 for movement along the axis thereof upon braking action, as is conventional in spot type brakes.

A brake housing 6 is provided for positioning portions of the brake 1 and this housing 6 has a brake lining 7 fixedly secured thereto on and adjacent to one face of the brake disc 5, while a second brake lining 8 is movably associated with the opposed side portion of the brake disc 5. The brake linings 7 and 8 usually are provided in a form of discs adapted to engage the brake disc 5 at localized, opposed portions of the periphery thereof. One or more of such pairs of opposed brake lining members are associated with different portions of the circumference of the brake disc, as desired. The brake lining 7 is suitably secured to and carried by a brake piston 9 operatively received in a cylinder 10 provided in the brake housing 6. Any suitable means, such as a conventional fitting and conduit 11, are carried by the brake housing 6 and connect to the cylinder 10 but extend from the brake housing for engaging with suitable means for supply of hydraulic fluid thereto, under pressure, for actuation of the brake piston 9.

It will be seen that a suitable cap 12 is secured to the brake housing 6 to enclose the outer end of the cylinder 10, which cap 12 has an auxiliary cylinder 13 provided therein and extending axially thereof. A control piston 14 is slidably and operatively received in the auxiliary cylinder 13, being sealed therein by a conventional O-ring, or similar member 15, carried by the peripheral portion of the piston 14. The control piston 14 has a piston rod 16 extending therefrom and the axially inner end thereof slidably extends through the cap 12, being sealed in engagement therewith by conventional sealing means, such as an O-ring. Thus the control piston 14 and the associated portions of the auxiliary cylinder 13 form an air tight compartment to which a compressed gas, such as air, is supplied by a bore 17 provided in the cap 12 and connecting to a member, such as a conventional tire valve 18, in threaded engagement with the cap 12. Hence any conventional member can be engaged with the valve 18 for forcing a volume of air through the bore 17 into the auxiliary cylinder 13 to be compressed to a desired pressure therein and be used as indicated hereinafter.

As another feature of the invention, the axially inner end of the piston rod 16 is tapped at its axially inner end and engages a cap screw 20 extending through the brake piston 9 so that the control piston 14 and brake piston 9 form a unitary assembly in the brake 1. It should also be noted that the piston rod 16 has a tapped axially outer end with which a second control screw 21 is engaged and usually extends axially outwardly slightly therefrom for abutting against a member, such as a cover plate 22, that substantially encloses the outer end of the auxiliary cylinder 13 in the cap 12 to prevent entry of dirt or other foreign matter therein. The control screw 21 thus may have a conventional member, such as a socket wrench, engaged with a head portion thereof to vary the axial relationship of such control screw 21 and piston rod 16 so that the released position of the piston 14 will be controlled thereby, as indicated in the drawings. Thus the inoperative or released position of the brake piston 9 and brake lining means 7 and 8 can be manually controlled to provide the desired operative clearance in the brake 1, as the brake linings 7 and 8 become worn and decrease in thickness.

As yet another important feature of the brake 1, a pressure relief valve means is provided in connection with the auxiliary cylinder 13 for bleeding off any excess air pressures built up or accumulated therein as the brake linings wear and the piston 14 moves axially inwardly of the auxiliary cylinder 13. To this end, another bore 23 is provided in the cap 12 and it connects to an enlarged recess 24 in which a valve disc 25 is held in sealing relationship with an annular valve seat 26 by a pressure coil spring 27. The outer end of this recess 24 is closed by means such as a set screw 28. Thus the pressure exerted upon the valve disc 25 determines the maximum pressure that can be set up within the auxiliary cylinder 13 so that when such pressure exceeds the predetermined maximum, the gas pressure will push the valve disc 25 off of the seat 26 against the action of the coil spring 27. Any gas so escaping from the cylinder 13 will bleed out through the threads holding the set screw 28 in position.

From the foregoing, it will be seen that a relatively simple, uncomplicated structure has been provided for insuring the return of braking means in a brake to a clearance or inoperative position when the hydraulic pressure means used for brake actuation are released. At such times the gas pressure of the gas received in the closed auxiliary cylinder 13 is sufficient to overcome any frictional or other forces existing in the brake 1 and return the brake piston and the brake lining 8 to a clearance, inoperative position. The apparatus is sturdily constructed and is made from relatively inexpensive parts. Normally in use the brake and its control means will require a minimum of maintenance inasmuch as the pressure provided in the operating chamber within the brake will be maintained therein over a long service life. Hence it is submitted that the objects of the invention have been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In combination in a brake, a housing having a cylindrical bore, a piston slidable in the bore, a block of friction material carried by the piston, a cap closing the end of the bore opposite the block of friction material, means for supplying hydraulic fluid under pressure inside the bore between the cap and the piston, said cap having an axial cylinder terminating in an axial hole adjacent the piston, an auxiliary piston slidably received in the cylinder, a rod on the auxiliary piston and extending slidably through the hole, means securing the piston to the rod, a screw adjustably secured to the auxiliary piston and extending in a direction opposite to the piston rod, a plate secured to the cap and covering the end of the cylinder and having a hole therethrough for adjustment of the screw, valve means carried by the cap and connected to the end of the cylinder nearest the friction material for supplying air under pressure to the cylinder, and a pressure relief valve carried by the cap and connected to the end of the cylinder nearest the friction material.

2. In combination in a brake, a housing having a cylindrical bore, a skirted piston slidably received in the bore, a block of friction material carried by the piston on the side opposite the skirt, a cap received in and closing the end of the bore opposite to the friction material, an integral boss on the cap extending within the skirt of the piston, a cylindrical cup-shaped opening positioned axially of and within the cap and boss, the end of the boss closest to the skirted piston forming the bottom of the cup-shaped opening, an auxiliary piston slidably received in the opening, a rod connecting the auxiliary piston and the skirted piston and extending slidably but in sealed relation through the bottom of the cup-shaped opening, valve means carried by the cap and connected to the bottom of the cup-shaped opening to supply air under pressure to the opening, and means for supplying hydraulic pressure to the bore on the skirted side of the piston.

References Cited in the file of this patent
UNITED STATES PATENTS

| | | |
|---|---|---|
| 178,965 | Sellers | June 20, 1876 |
| 2,193,736 | Onions | Mar. 12, 1940 |
| 2,644,549 | Cagle | July 7, 1953 |